Nov. 11, 1952     W. C. CARLTON     2,617,664

VEHICLE TIRE PROTECTING DEVICE

Filed Feb. 23, 1949

Inventor
WILLIAM C. CARLTON
By
Young, Emery & Thompson
Attorneys

Patented Nov. 11, 1952

2,617,664

UNITED STATES PATENT OFFICE 2,617,664

VEHICLE TIRE PROTECTING DEVICE

William Charles Carlton, Hornchurch, England

Application February 23, 1949, Serial No. 77,834

5 Claims. (Cl. 280—158.1)

This application is a continuation-in-part of my copending applications, Serial No. 29,143 filed May 25, 1948, now Patent No. 2,585,914, and 65,342, filed on the 15th of December, 1948.

The present invention relates to devices for protecting and preserving the tires of motor vehicles and other wheeled vehicles, and is applicable with particular advantage to the protection and preservation of tires of rubber, or other resilient substances, such as are usually applied to motor cars, lorries, motor omnibuses, bicycles, and other road vehicles and aircraft.

In order to maintain the tires of vehicles in good condition, and to obtain the maximum length of service therefrom, it is necessary as far as possible to prevent any nails or other metallic objects, flints, stones, or other foreign bodies from adhering to, and becoming embedded in, the tire surfaces, and for this purpose, it has previously been proposed to provide mechanical devices for deflecting or extracting from the tire surfaces such bodies which have collected thereon, so as to prevent the said bodies from subsequently becoming embedded in the tire.

I at present prefer to mount my tire-protecting and preserving devices so that the extractor or deflector blade or equivalent means is yieldingly maintained in comparatively light contact with the tire surface to be protected or is adapted lightly to contact the said tire surface during rotation of the tire. By "tire surface" is meant the tire surface per se or the extraneous matter with which the tire surface may become coated by contact with the road. Moreover, I have found it to be necessary or, at least, highly desirable to arrange for the extractor or deflector blade or equivalent means to be readily deflected from its operative position and clear of the tire surface to enable the foreign bodies extracted or deflected thereby to pass freely between the tire surface and extractor means in a rolling and/or sliding motion without damage to the tire surface.

Now, by reason of the extractor or deflector blade being yieldingly held in the operative position by a readily yielding and resilient force, the blade may vibrate and eventually commence to hammer or bounce, without regard to the condition of the tire surface, when the tire is travelling at speed upon a road surface which is rough or worn or built into ridges. Moreover, some undesirable effects may arise if the tire surface assumes a wave-like or ridged form in wear or is built with such a surface. The effect may well be that the extractor or deflector blade or tire-contacting means associated therewith will tend to jump or skip from the undulations of the tire surface as the speed of rotation of the tire increases. Thus, the extractor or deflector blade may commence to vibrate and the vibration may develop into a hammering or bouncing action, particularly if the speed of rotation of the tire becomes such as to produce periodic or sympathetic vibration of the blade and its mountings.

Such hammering or bouncing will obviously detract from the efficiency of the tire-protecting or preserving device since it will produce an undesirably wide gap of varying width between the tire surface and extractor or deflector blade when the tire is rotating at speed and may also lead to fatigue and failure of the structure of the device. The vibrating movement of the extractor or deflector blade may, of course, be considerably reduced or obviated by appropriately increasing the resilient force which is used for urging the blade towards the tire surface, or by providing such a force, but a resilient force which is sufficient for the stated purpose will tend to cause the blade or its equivalent or the associated tire-contacting means to press unduly heavily upon the tire surface thereby leading to overheating and excessive wear of both tire and blade or other tire-contacting means and possibly to actual damage to the tire surface by causing the extracted or deflected foreign bodies to score the said surface while passing between the said extractor or deflector means and tire surface.

The present invention has for its primary object to obviate the above described disadvantages in the operation of the tire-protecting or extracting device.

With the above object in view, according to the present invention, I provide a tire-protecting or preserving device comprising an extractor deflector blade or equivalent member, means for yieldingly holding the extractor or deflector member in operative position in relation to the tire surface which is to be protected thereby, and means for damping the movement imparted to the extractor or deflector member by irregularities or uneven formation of the said tire surface or vibration of the tire and/or associated wheel mountings.

In order to facilitate an understanding of this invention, reference is made to the accompanying drawings in which.

Figure 1:
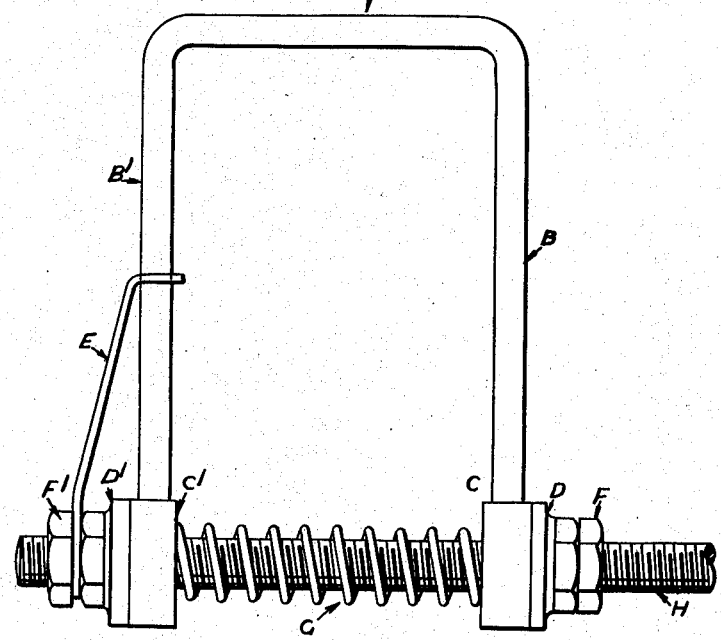
Figure 1 is a plan view of tire protecting and preserving device according to the present invention.

According to the present invention, it has been discovered that the damping of tire saving devices may be made so effective that the blade does not return to the tire without the assistance of the vibration of the vehicle. This is in fact highly satisfactory because it enables a very light load indeed to be imposed on the tire with comparatively heavy damping at the same time. One method of achieving this is by means of springs or a cylinder of resilient material such as polyvinyl chloride or rubber and is detailed hereafter. This system is made possible by the fact that the vibration of the vehicle will urge the tiresaver ejector towards the tire if it is away from the tire providing that the direction of movement is assisted by a spring or by gravity. In addition, the damping can be made to a desired degree by adjusting the spring tension. A method of doing this is now described with reference to Fig. 1.

A is an ejector which in this instance is integral with two arms B and B' which in turn are welded to two flat steel washers C and C'.

D and D' are special nuts having a flat surface approximately the same diameter as the washers C and C' and these are screwed onto the arm H (which in turn is fixed to the vehicle) in such a manner that the spring G is between the two washers C and C' and these special nuts D and D' impose a force so that D is pressing against C, G is pressing against C and C' and this C' presses against D'. D and D' are fixed in position by F and F' which are locking nuts, but between D' and F' is a piece of spring steel wire E looped around the shaft H and is locked by F' in position behind B'. When the shaft H and the nuts F, D, D' and F' and the spring E (at the shaft end) are fixed in position, any movement of A is damped by a friction set up between D and C and C' and D' and by adjusting the nuts this friction can be increased or decreased, and by adjusting the position of E, blade A can be made to return to its original position after displacement. The friction between the surface D and C and C' and D' will control this return which by suitably adjusting the nuts F, D, D' and F' can be made a free return or can be made so stiff that only the vibration of the vehicle will jog the blade into position with the assistance of E.

In my application Serial No. 29,143 filed May 25, 1948, Figure 10 shows a method of combining metal rod or wire and a plastic material to form a damper. I now know that for tiresavers not subject to heavy duty it is sufficient for only a part of the supporting member to be made in this way and that a gap can be left consisting of only one material providing that the supporting material across the gap is secured in such a way that the fixing at each end permits the damping effect to extend for some distance into the undamped material. If the undamped section is left too long the effect is lost and the blade will vibrate. The proportions given in Figures 2 and 3 of the present application illustrate suitable proportions for a tiresaver of this type for a bicycle. In the description that follows polyvinyl chloride is used as the connecting medium because in addition to being resistant to weathering and grease it is, in certain mixes, a damper in itself and therefore thinner sections giving a lighter load on the tire with minimum bounce can be obtained with this material.

This type of tiresaver should be secured to the vehicle so that the rotation of the tire will cause the ejector blade to place the supports under compression. When the direction of rotation of the tire is reversed or when the ejector blade is subject to a severe load, the supports will be caused to go into tension.

Figure 2:
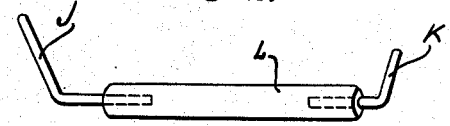
Fig. 2 is a side elevational view of a modified form of the invention.
Figure 3:
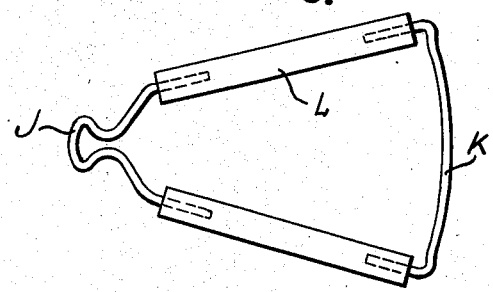
Fig. 3 is a plan view of the device of Fig. 2.

One version of this method will now be described with reference to the accompanying drawing Fig. 2 and Fig. 3.

J is a steel wire clip formed so as to form a securing point for a bolt on to the cycle and having its two ends shaped so as to fit very tightly into the bore of the polyvinyl chloride connection L, the joint of the two parts making an extremely firm joint which will serve to dampen the vibrations or bounces passed along the connection L from the blade K which is shaped in end elevation to intercept foreign bodies adhering to the tire surface, and is made of steel wire. The ends of this wire are firmly secured in the bore of the connection L. The device is fitted to a bicycle in such a way that the blade K is just in contact across the tire which it is desired to protect. An alternative fitting to J would be to have two separate fittings which fixed either to the fork or mudguards. The proportions shown in the drawings would give satisfactory results on a bicycle. If the weight of the blade were increased the cross-section of both L and J might have to be increased, to provide the extra damping necessary for the extra weight in K. If polyvinyl chloride is selected the mix can only be established for a range of vehicles by experiment according to the weight of the blade, care being taken to see that the mix selected does not go too hard when used at the lowest temperature likely to be encountered in the country concerned.

It has been found that polyvinyl chloride in the following mix was suitable for use in the devices of Figs. 2 and 3:

100 parts compound of Polyvinyl Chloride Polymer plasticized with 65 parts of plasticizing material. By reducing the plasticisers the damping effect is increased.

Other mixes were also found suitable and can be selected according to their damping and other physical properties.

The word damping as far as this patent application is concerned is to be taken in a sense which has come to be understood as damping in engineering as outlined hereafter. The applicant realises that almost any body vibrating in air is damped to a certain degree by the air around it and by friction set up within itself, but the degree is so small that engineers neglect it. To illustrate this point by examples: A tuning fork vibrating in air would, from the desired viewpoint, be considered to be vibrating freely; if permitted to vibrate in a vacuum it would be considered that steps had been taken to prolong the time of vibration; and if a flat disc large enough to encounter a considerable body of air were fixed to a fork it would be considered that steps had been taken to damp the vibration; a similar result could be obtained by placing the human finger on the fork. To give another example, a normal leafed suspension spring on an automobile is considered from the desired viewpoint to be damped when a shock absorber is fitted or when brake lining is interspaced between the leaves. To give a last example, a string vibrating in air would, from the desired viewpoint, be considered to be vibrating freely, while the same string vibrating in oil would be considered as damped.

Having described my invention I claim:

1. A device for protecting a tire mounted on a vehicle wheel comprising an extractor member for removing foreign matter from the surface of the tire, a mounting member for connecting the device to the vehicle, and an energy absorbing coupling member of the type which slowly returns to its relaxed position after deflection for connecting said extractor member to said mounting member, said coupling member acting as a damper to movement imparted to said extractor member by irregularities in the tire surface, vibration of the tire, and vibration of the mounting member while permitting displacement of the extractor member relatively to the tire surface by the forces applied thereto as the tire rotates.

2. A device according to claim 1 wherein the coupling member is polyvinyl chloride.

3. A device according to claim 1 wherein the coupling member is a composition composed of a plasticized vinyl chloride polymer.

4. A device for protecting a tire mounted on a vehicle wheel comprising an extractor member having two arm portions extending therefrom for removing foreign matter from the surface of the tire, a mounting member having two arm portions extending therefrom for connecting the device to the vehicle, and two polyvinyl chloride energy absorbing coupling members of the type which slowly return to their relaxed positions after deflection for connecting the arm portions of said extractor member and mounting member respectively, said coupling members acting as dampers to movement imparted to said extractor member by irregularities in the tire surface, vibration of the tire, and vibration of the mounting member, while permitting displacement of the extractor member relatively to the tire surface by the forces applied thereto as the tire rotates.

5. A device according to claim 4 wherein the mounting member is polyvinyl chloride and the polyvinyl chloride coupling members are integral with the arm portions of said mounting member.

WILLIAM CHARLES CARLTON.

REFERENCES CITED

The following references are of record in the file of this patent:

UNITED STATES PATENTS

| Number | Name | Date |
|---|---|---|
| 1,156,248 | Nichol | Oct. 12, 1915 |
| 2,205,654 | Idle | June 25, 1940 |
| 2,338,323 | Fink | Jan. 4, 1944 |
| 2,361,496 | Pointer | Oct. 31, 1944 |

FOREIGN PATENTS

| Number | Country | Date |
|---|---|---|
| 4,381 | Great Britain | Apr. 20, 1914 |
| 86,501 | Switzerland | Sept. 1, 1920 |
| 337,163 | France | Feb. 8, 1904 |

OTHER REFERENCES

Ind. & Eng. Chemistry, August 1939, pp. 964–968.